United States Patent
Steinert

(10) Patent No.: US 10,457,003 B2
(45) Date of Patent: Oct. 29, 2019

(54) METHOD OF PRODUCTION FOR ATTACHING A PROFILE TO A TOOTHED BELT

(71) Applicant: BRECO Antriebstechnik Breher GmbH & Co. KG, Porta Westfalica (DE)

(72) Inventor: Thomas Steinert, Bad Oeynhausen (DE)

(73) Assignee: BRECO Antriebstechnik Breher GmbH & Co. KG, Porta Westfalica (DE)

( * ) Notice: Subject to any disclaimer, the term of this patent is extended or adjusted under 35 U.S.C. 154(b) by 119 days.

(21) Appl. No.: 15/813,367

(22) Filed: Nov. 15, 2017

(65) Prior Publication Data

US 2018/0194093 A1 Jul. 12, 2018

(30) Foreign Application Priority Data

Jan. 6, 2017 (EP) .................................... 17150510

(51) Int. Cl.
*B29D 29/08* (2006.01)
*F16G 1/14* (2006.01)
*F16G 1/28* (2006.01)
*B21D 53/14* (2006.01)
*B65G 15/48* (2006.01)
*F16G 1/20* (2006.01)
(Continued)

(52) U.S. Cl.
CPC ............. *B29D 29/08* (2013.01); *B21D 53/14* (2013.01); *B65G 15/48* (2013.01); *F16G 1/14* (2013.01); *F16G 1/20* (2013.01); *F16G 1/28* (2013.01); *F16G 3/10* (2013.01); *B29C 43/06* (2013.01); *B29C 43/222* (2013.01); *B29L 2031/7092* (2013.01)

(58) Field of Classification Search
CPC ..... F16G 1/14; F16G 1/28; F16G 1/20; F16G 3/10; B21D 53/14; B29L 2031/7092; B29D 29/08; B29C 43/222; B29C 43/06; B65G 15/48
See application file for complete search history.

(56) References Cited

U.S. PATENT DOCUMENTS 6,419,775 B1 * 7/2002 Gibson .................. B32B 25/10
156/137

FOREIGN PATENT DOCUMENTS

WO 2016/123645 8/2016

OTHER PUBLICATIONS

LionAlex: "GT3 120mm Timing Belt", May 9, 2014, XP002771847, www.thingiverse.com.
(Continued)

*Primary Examiner* — Vishal I Patel
(74) *Attorney, Agent, or Firm* — Rankin, Hill & Clark LLP

(57) ABSTRACT

The invention relates to a method of production for attachment by cohesive bonding of a profile having at least one profile element onto a toothed belt previously produced as a semi-finished product. The toothed belt has a tooth side with a toothing and a toothed belt back located on the back of the tooth side of the toothed belt. In the method of production the at least one profile element is built up layer by layer from at least one first profile element layer and a second profile element layer on the toothed belt back, by the application of an application compound to the toothed belt back at a profile element position by melt layer printing.

15 Claims, 2 Drawing Sheets

Figure 1:
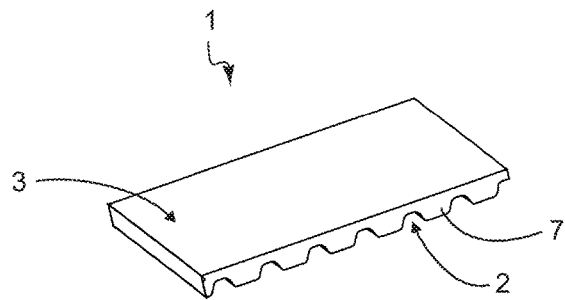

(51) Int. Cl.
*F16G 3/10* (2006.01)
*B29C 43/06* (2006.01)
*B29C 43/22* (2006.01)
*B29L 31/00* (2006.01)

(56) References Cited

OTHER PUBLICATIONS

Anteino: "Customizable GT2 timing belt", Dec. 17, 2016, XP002771848, www.thingiverse.com.
B&B Manufacturing: "Timing Belts & Components for 3D Printers", Dec. 4, 2016, XP002771849.
Zen Toolworks: "Zen Toolworks Flexible Filament 3d Printed Timing Belt", Jul. 24, 2014, XP054977525.
European Search Report filed in EP17150510 dated Jul. 13, 2017.

* cited by examiner

METHOD OF PRODUCTION FOR ATTACHING A PROFILE TO A TOOTHED BELT

The invention relates to a method of production for attachment by cohesive bonding of a profile having at least one profile element onto a toothed belt previously produced as a semi-finished product and having a tooth side with a toothing and a toothed belt back located on the back of the tooth side of the toothed belt.

A toothed belt of the aforementioned type which is to be produced has the teeth of the toothed belt on one side. A profile is arranged on another side, i.e. on the back of the tooth side of the toothed belt. The profile can have one single profile element or a plurality of profile elements, wherein in the case of a plurality of profile elements the individual profile elements may be designed identically or differently from one another. Such toothed belts with a profile positioned on the back side of the toothed belt are used, for example, in production lines. There the profile serves for conveying workpieces from one processing station to another processing station.

The required type of profile, for example with regard to the shape of individual profile elements and the distance between two adjacent profile elements, is conceivable in almost any number of configurations and is dependent upon the respective purpose for which it is to be used. For this reason, there is a need to be able to tailor a profiled back side of a toothed belt for intended uses.

In the known approaches for producing profiled toothed belts a prefabricated toothed belt is provided as a semi-finished product. The provision of a toothed belt as a semi-finished product makes it possible, already from the outset, to provide a considerable component of the volume of the toothed belt to be produced in order to minimize the total time taken for the fabrication. The known approaches also include a working step in which the profile elements forming the profile are produced, for example, by spraying, casting or machining. In a further working step the previously produced profile elements are joined to a toothed belt likewise produced beforehand. The joining of the individual profile elements can take place cohesively by welding or by form fitting by mounting (for example, screwing on). At least in the case of cohesive joining, in a further working step the weld burr occurring during welding must be removed. Since in these known approaches the individual profile elements must be prefabricated and manually joined to the toothed belt, the method of production is time-consuming and costly. The substantial expenditure is not least the result of the necessity to provide special tools such as, for example, injection molds. During the attachment of the individual profile elements or after completion of the attachment of the individual profile elements, costly manual reworking may be necessary on the individual profile elements. The working step of deburring may be mentioned as a disadvantageous example of the manual reworking in the case of welded profile elements.

The object of the invention is to provide a method of production for attachment by cohesive bonding of a profile having at least one profile element onto a toothed belt previously produced as a semi-finished product, which method is cost-effective and ensures sufficient mechanical loading capacity of the profile to be attached.

This object is achieved according to the invention by a method of production including the features according to claim 1. In particular, according to the invention the object is achieved in that the at least one profile element is built up layer by layer from at least one first profile element layer and a second profile element layer on the back of the toothed belt, by the application of an application compound to the toothed belt at a profile element position by means of melt layer printing.

Advantages and expedient embodiments and modifications of the invention are disclosed by the sub-claims.

The invention provides a method of production for cohesive attachment of a profile having at least one profile element on a toothed belt previously produced as a semi-finished product, which method is characterized by great flexibility with regard to the design of the profile elements to be applied. With the aid of melt layer printing profile elements of any shape can be printed directly onto a toothed belt previously produced as a semi-finished product. In this case the working step of melt layer printing according to the invention covers the working steps which are necessary in the known approach of welding, namely the steps of separately producing profile elements, joining and deburring, so that with increased flexibility with regard to the shape of the profile element it is possible to save on several working steps. The production method according to the invention avoids compromises with regard to the mechanical load-bearing capacity and the durability of the produced toothed belt, as the melt layer printing produces profile elements on a toothed belt, which with regard to their load-bearing capacity and durability do not differ from profile elements which are joined to a toothed belt by means of the approaches known from the prior art. In this case the flexibility obtained by the melt layer printing is expressed not only in the shaping of the profile elements. In fact, due to the invention a significant reduction of the production effort and the production costs is possible in particular in the event of small quantities involving profile elements to be prepared individually, for which the creation of an injection molding tool would not be economically viable. Because exclusively the profile of the toothed belt is formed by means of melt layer printing, the high degree of flexibility in terms of adaptability of the shape of the profiles is advantageously combined with a time-efficient procedure. A provision of corresponding special tools, in particular injection molding tools, hitherto necessary for production of the profile elements or of the entire profiled toothed belt, or the use of time-consuming and costly machining operations for profile production, are omitted in the production method according to the invention.

In the production method according to the invention, in an embodiment of the method step of building up the at least one profile element it is provided that a melt layer 3D printer with at least one print head is provided, that the profile element position of the back of the toothed belt is positioned in a working range of the print head of the melt layer 3D printer, that at least the profile element position of the back of the toothed belt is heated to a predetermined application temperature, that the first profile element layer is applied by means of melt layer printing from the application compound, after the back of the toothed belt has reached the predetermined application temperature, that starting on the first profile element layer at least the second profile element layer of the application compound is applied as a layer, and that the at least one profile element is finished by applying profile element layers of the application compound and the finished profile element is moved out of the working range. During position of the profile element position of the back of the toothed belt, the toothed belt previously produced as a semi-finished product is moved relative to the print head of the melt layer 3D printer, so that the profile element position of the back of the toothed belt is positioned in the working range of the print head. For this purpose, a movement of the back of the toothed belt, a movement of the print head or a movement of both relative to one another is possible. It is significant that the print head is positioned in such a way that an application of the application compound to the back of the toothed belt can be started in the region of the profile element position. The predetermined application temperature is a temperature which at least the back of the toothed belt has in its profile element position at the time at which the application of the first profile element layer is started. Whether the positioning and the heating are carried out successively or partially or completely simultaneously is not important, but can be decided individually depending upon the framework conditions. After the toothed belt has reached the predetermined application temperature, the application of the first profile element layer by means of melt layer printing of the application compound is started, on which then a layered application of at least the second profile element layer of the application compound takes place, until the profile element is finished and is then moved out of the working range. This means in particular that by means of the melt layer printing a profile can be produced in such a way that a post-processing is not necessary. The combination of the provision of a semi-finished product and the application of a profile element by means of melt layer printing as provided according to the invention leads to the considerable advantage that with a high time efficiency a toothed belt can be produced with profiles arranged on the back of the toothed belt, which is possible without the need for post-processing. Obviously, this does not preclude post-processing of the profile element, but then this is carried out optionally.

In particular, in order to achieve good strength properties of the profile element and the fastening point of the profile element on the toothed belt, in an embodiment of the invention it is preferably provided that, during application of a second or a further profile element layer on the profile element layer applied immediately beforehand, the print head is moved to rest thereon in such a way that a pretension is exerted on the previously printed profile element layer. In other words, the movement of the print head is controlled in such a way that, either directly by means of the print head or indirectly by means of a respectively deposited application compound, pressure is exerted on the profile element layer which was finished immediately before the profile element layer subjected to the pressure at a certain time. Since the previously positioned profile element layers also have not yet completely solidified, the exerted pretension in the course of curing of the individual profile element layers leads to the pretension being perpetuated in the finished profile element. It has been shown that such a procedure gives rise to a higher mechanical load-bearing capacity of the applied profiles which exhibits its advantageous effect in particular with regard to tensile and shear strength.

Preferably, in a further embodiment of the invention it is provided that the toothed belt has a first thermoplastic polyurethane. In particular, it is preferable that the toothed belt has a first thermoplastic polyurethane at the profile element position. Particularly preferably, it is provided that the entire toothed belt is provided, at least on its surface, with the first thermoplastic polyurethane or the toothed belt consists completely solidly of the first thermoplastic polyurethane. Polyester or polyether is particularly suitable as the first thermoplastic polyurethane. Polyester and polyether are cost-effective and ubiquitously available. Furthermore, the material classes of the polyester and the polyether have, in addition to the required thermoplastic behavior, a plurality of further positive properties, in particular also with regard to their mechanical stability and their good suitability for further processing.

In an embodiment of the invention a procedure has proved particularly advantageous in which the predetermined application temperature for the heating of at least the profile element position of the back of the toothed belt lies between the glass transition temperature of the first thermoplastic polyurethane and a temperature at least 10 K, preferably 20 K, higher than the glass transition temperature of the first thermoplastic polyurethane. It has been shown that exceeding the glass transition temperature creates preconditions in order to create a particularly good connection of the applied profile elements to the back of the toothed belt at the profile element position. It has also been shown that an application temperature which is too high has the disadvantage that deformations of the back of the toothed belt occur as a consequence of the mechanical forces occurring during the melt layer printing. These are partially irreversible and therefore undesirable, since they have a negative impact on the exact controllability of the shape and the properties of the finished toothed belt.

In an embodiment of the invention PBT, PET, PLA, PTT, PEN, PC, PEC, PAR or UP may be considered, for example, as polyester. Furthermore, for example, PEEK or PEK or PETK may be considered as polyether. However, a mixture or blend of different polyurethanes can also be used as polyurethane, in particular a mixture or a blend of polyesters with polyethers can also be used.

In the context of the invention the term "polyurethane" should cover polyurethane being the main component of the respective material, but additionally other materials may be added or mixed in, wherein a proportion of the volume of the polyurethane or the polyurethane is at least 50%.

In an embodiment of the invention convective methods or thermal radiation and heat transfer methods can be provided for heating of the back of the toothed belt. In particular it can be provided that the toothed belt is heated on its toothing side by a heating plate and the heating of the back of the toothed belt takes place by means of thermal conduction through the toothed belt. A combination of two or more of these methods of heating can be provided.

In an embodiment of the invention a second thermoplastic polyurethane is preferably provided as application compound. This means that at least 50%, preferably at least 90%, particularly preferably at least 95% of the application compound consists of thermoplastic polyurethane. In a particularly preferred case the application compound consists exclusively of thermoplastic polyurethane, preferably of one single thermoplastic polyurethane. In this case polyester and/or polyether can be used as thermoplastic polyurethane, wherein in principle above all the same polyester and/or polyether may be considered for the first thermoplastic polyurethane. For the application compound it can also be provided that a mixture or a blend of a plurality of the aforementioned polyester or polyether is used. However, a thermoplastic polyurethane which is present as a pure material is preferred. It is particularly preferable that one and the same material is used for the back of the toothed belt, at least at the profile element position, and for the application compound. In particular, the cohesive connection between the back of the toothed belt and the profile element is favored by such use of one and the same material. Moreover, the probability of chemical reactions which are disadvantageous for the quality of the material bonding is reduced when one and the same material is used.

In order to implement a good cohesive connection between the first profile element layer and the back of the toothed belt, in an embodiment of the invention it has proved advantageous that the first profile element layer has a higher layer height than the second profile element layer, preferably than all further profile element layers. Good results have been achieved with a configuration in which the first profile element layer is designed with a layer height of at least 1.5 times the layer height of the second profile element layer.

A preferred embodiment of the production method according to the invention provides that the first profile element layer has a layer height of 0.18 mm to 0.22 mm and the second profile element layer has a layer height between 0.08 mm and 0.12 mm. With said layer heights, on the one hand, the resolution limits of typical commercially available 3D printers are exploited, whilst simultaneously a compromise is reached between the application speed and the intended strength of the finished profile element.

A preferred embodiment of the production method according to the invention further provides that the first profile element layer is printed at a material temperature which is between 5 K and 10 K above the melting temperature of the application compound. Following this, in the course of the layered application of the profile element layers the material temperature is reduced to a value above the melting temperature of the application compound which is simultaneously preferably less than 2.5 K above the melting temperature of the application compound, particularly preferably less than 1 K above the melting temperature of the application compound. Such a procedure makes it possible that the first profile element layer has sufficient heat in order to make a tenable connection to the back of the toothed belt. In particular, when the back of the toothed belt has the application temperature predetermined for it, and the predetermined application temperature is in the region of the glass transition temperature of the first polyurethane, due to the temperature of the application compound between 5 K and 10 K above the melting temperature a temporary melting of the application compound can take place on the back of the toothed belt. An application temperature of the back of the toothed belt which is between the glass transition temperature and a temperature 20 K higher is particularly advantageous. The effect of this is shown particularly advantageously in the above-mentioned choice of the layer thickness of the first profile element layer. At the same time due to the controlled limitation of the temperature in the region above the melting temperature no unwanted deformation of the back of the toothed belt takes place. In order by the application of the profile element layers to prevent a deformation of the respective previously applied profile element layer lying below a profile element layer, it is provided that with further application of the profile element layers the material temperature falls successively in the manner described above.

In an embodiment the invention further provides that, for positioning of the toothed belt, the toothed belt is preferably gripped in a belt drive which can be driven cyclically. Then for positioning the profile element position in the working region of the print head a cyclical movement of the belt drive can be used. In the dimension of a longitudinal direction of the toothed belt, accurate positioning of the toothed belt as required is made possible by this procedure.

In an embodiment of the invention a movement of the print head with a robot arm can be provided for application of the application compound. A robot arm is preferably used which can be moved along three spatial axes, and in addition can be moved pivotably about at least two of the three spatial axes. In principle it may be provided that during deposition of the application compound this compound is rotated with the print head about its own longitudinal axis, in order to obtain further strength advantages by means of a resulting twist structure.

In order to ensure that the quality and strength of the cured application compound meet the mechanical requirements of the profiled toothed belt, in an embodiment of the invention it is provided that before the application to the back of the toothed belt the application compound is stored in a drying chamber and kept at a predetermined residual moisture content, wherein the application compound is removed from the drying chamber immediately before delivery to the print head. Particularly good results are obtained when it is ensured that the application compound is applied with a residual moisture content von 0.05% by weight or less than 0.05% by weight.

Furthermore, for process and quality control, in an embodiment of the method according to the invention it is provided that the ambient temperature and/or the ambient humidity can be monitored during the application and can be kept at a respective constant, predetermined value, wherein this value can be regulated.

In order to ensure good adhesion between a profile element and the back of the toothed belt, according to a further advantageous embodiment it is provided that the back of the toothed belt is subjected to cleaning for removal of waxes before the application of the application compound to the back of the toothed belt.

It will be understood that the features referred to above and still to be explained below can be used not only in the respective combination stated but also in other combinations or by themselves without departing from the scope of the present invention. The scope of the invention is defined only by the claims.

Figure 2:
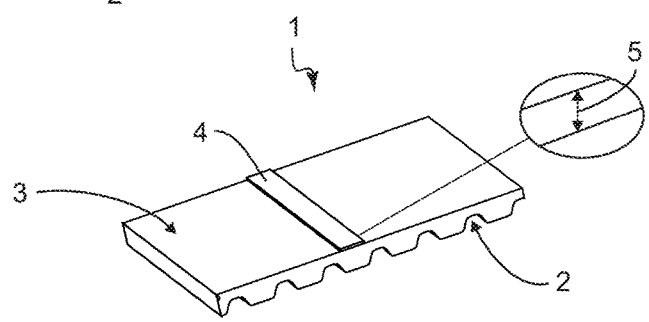
Figure 3:
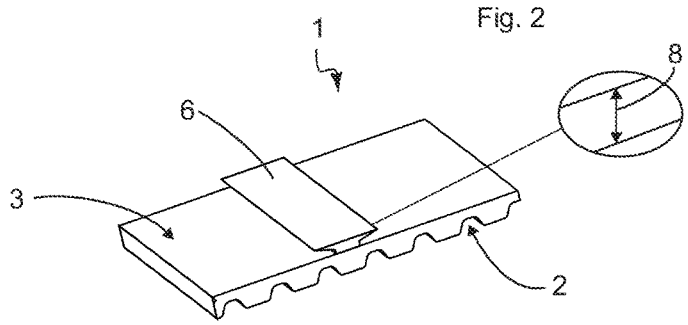
Figure 4:
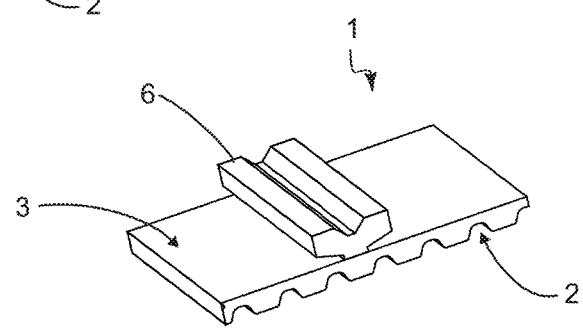
Figure 5:
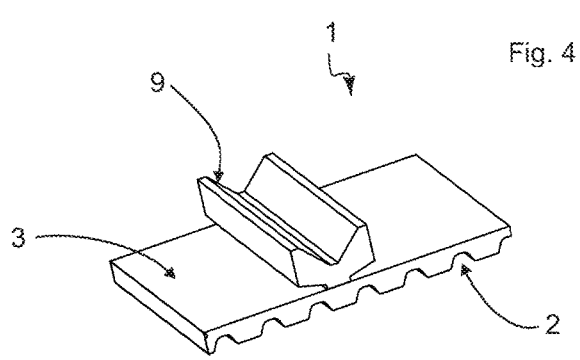
Figure 6:
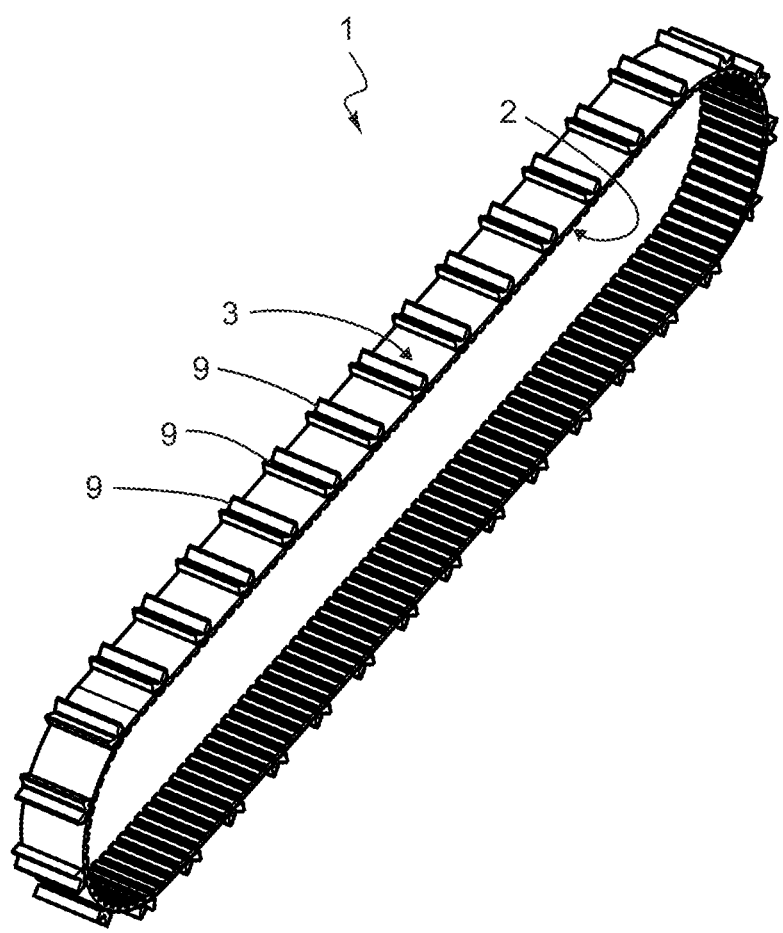

Further details, features and advantages of the invention are apparent from the following description in connection with the drawings, in which a preferred exemplary embodiment of the invention is illustrated by way of example. In the drawings:

FIG. 1 shows a perspective view of a portion of the back of a toothed belt;

FIG. 2 shows a perspective view of the toothed belt according to FIG. 1, wherein a first profile element layer of a profile element is attached to the back of the toothed belt, FIG. 3 shows a perspective view of the toothed belt according to FIG. 2, wherein a second profile element layer is attached to the first profile element layer, FIG. 4 shows a perspective view of the toothed belt according to FIG. 3, wherein further second profile element layers are attached to the previously applied profile element layers, FIG. 5 shows a perspective view of the toothed belt according to FIG. 4, wherein the profile element layer is finished by the layered application of profile element layers, FIG. 6 shows a perspective view of a toothed belt with finished profile element.

In FIG. 1 a portion of a pre-produced toothed belt 1 can be seen, which is produced in a known manner and is provided as a semi-finished product for the method according to the invention for cohesive attachment of at least one profile element. The pre-produced toothed belt 1 has a plurality of teeth 7 on a first side, which in the context of the invention is designated as the tooth side 2. The other side, i.e. the side of the toothed belt 1 opposite the tooth side 2, constitutes a toothed belt back 3. A profile having at least one profile element should be attached cohesively to the back of the toothed belt 3 by means of melt layer compression, wherein the at least one profile element is built up of layers of a coating compound. Before the application of the coating compound to the toothed belt back 3 of the toothed belt 2, the toothed belt back 3 is cleaned to ensure that it is grease-free, clean and free of so-called processing waxes. Next the toothed belt is positioned at its profile element position, that is to say the position at which the profile element is intended subsequently to be printed onto the toothed belt back, wherein the positioning is oriented to a working region of a print head of a melt layer 3D printer. After the positioning, at least the profile element position of the back of the toothed belt is heated to a predetermined application temperature. In the exemplary embodiment described here the toothed belt 1 consists of a thermoplastic polyurethane (TPU), wherein the predetermined application temperature to which the back of the toothed belt 2 or at least the profile element position of the toothed belt 1 is heated is 80° C.

After the predetermined application temperature of 80° C. is ensured at least for the profile element position, for which corresponding measuring probes or sensors are provided, the melt nozzles of the melt layer 3D printer are heated to 235° C., which corresponds to a temperature above the melting temperature of an application compound from which the profile element to be produced is formed. The application compound is likewise a thermoplastic polyurethane (TPU). As soon as the melt nozzles are heated, a first profile element layer 4 is applied by means of melt layer printing of the application compound to the profile element position, which is illustrated in FIG. 2. The first profile element layer 4 has a layer height 5 of 0.2 mm.

After the application of the first profile element layer 4, there follows the application of a second profile element layer 6, which is shown in FIG. 3. The second profile element layer 6 has a layer height 8 of 0.1 mm. It has been shown to be advantageous that the first profile element layer 4 by comparison with the second profile element layer 6 is formed with at least 1.5 times the layer height.

In FIGS. 4 and 5 further second profile element layers 6 are applied to the previously applied second profile element layers 6 until the profile element 9 for the one profile element position is finished (see FIG. 5). During application of a second or a further profile element layer to the profile element layer applied immediately beforehand, the print head is moved to rest thereon in such a way that a pretension is exerted on the previously printed profile element layer. Furthermore, the first profile element layer 4 is printed with a material temperature which is between 5 K and 10 K above the melt temperature of the application compound, wherein in the course of the layered application of the second profile element layers 6 the material temperature is reduced to a value above the melting temperature of the application compound which is less than 2.5 K, preferably less than 1 K, above the melting temperature of the application compound. During the application of the different profile element layers 6, as the distance from the surface of the toothed belt back 3 increases the temperature of the melt nozzles, i.e. the material temperature, is successively reduced from 235° C. to 225° C. The temperature range for the material temperature is chosen in such a way that the temperature is not too low, since at temperatures which are too low continuous extrusion of the application compound through the melt layer 3D printer is no longer ensured. On the other hand, the temperature also must not be too high, since this would lead to melting of the respective substrate and a resulting filament formation of the extruded application compound. It should also be noted that before the application of the first profile element layer 4 to the toothed belt back 3 the application compound is stored in a drying chamber and is kept at a predetermined residual moisture content. If the application compound has a residual moisture content of 0.05% by weight or less than 0.05% by weight, it is conveyed out of the drying chamber to the print head and is applied to the toothed belt back 3. Otherwise, the application compound must be dried in such a way that the predetermined residual moisture content is maintained. In addition to the residual moisture content of the application compound the ambient temperature is an important influential factor for smooth melt layer printing. Therefore, before and during the application of the application compound to the toothed belt back 3, the ambient temperature and/or the ambient humidity is monitored and kept at a respective constant, predetermined value, which is dependent upon the material used for the toothed belt and upon the material used for the application compound.

Further profile elements 9 can be applied and finished by further movement of the toothed belt 1 to corresponding other profile element positions. As an alternative to a movement of the toothed belt 1, the print head can also be moved to a predetermined further profile element position, in order to apply and finish further profile elements, wherein preferably a movement takes place as a cyclical movement or as a consequence of cyclical movements of the belt drive which can be driven cyclically, in order to convey a further profile element position into the working region of the print head. For illustration, FIG. 2 shows a toothed belt 1 having a finished profile consisting of a plurality of profile elements 9.

The term "melt layer printing" used in the context of the invention designates a 3D printing method, in which the object to be printed is applied layer by layer of a liquid plastic, as a thin plastic filament is printed from a hot nozzle. Thus, an extrusion of a plastic filament takes place with a guided deposition by a correspondingly moved nozzle. The nozzle which is a component of a print head moves relative to the toothed belt previously produced as a semi-finished product, on which printing takes place in order to apply the object to be printed.

With the invention a flexible and cost-effective production method for attaching profile elements to a prefabricated toothed belt. For the production according to the invention of such a toothed belt with profile elements, the hitherto necessary operations of spraying, casting or machining are omitted for required profile elements and the subsequent joining as well as deburring of any weld burr produced during joining. Instead, with the present invention a production method can be provided which can be operated automatically and increases productivity.

The invention claimed is:
1. A method of production for attachment by cohesive bonding of a profile having at least one profile element onto a toothed belt previously produced as a semi-finished product and having a tooth side with a toothing and a toothed belt back located on the back of the tooth side of the toothed belt, comprising:
   building up the at least one profile element layer by layer from at least one first profile element layer and a second profile element layer on the toothed belt back, by an application of an application compound to the toothed belt back at a profile element position by means of melt layer printing.

2. The method according to claim 1, wherein building up of the at least one profile element comprises the following steps:
provic a melt layer 3D printer having at least one print head,
positioning the profile element position of the toothed belt back in a working range of the print head of the melt layer 3D printer,
heating at least the profile element position of the toothed belt back to a predetermined application temperature,
applying the first profile element layer using melt layer printing from the application compound, after the toothed belt back has reached the predetermined application temperature,
starting on the first profile element layer, applying, layer by layer, at least the second profile element layer of the application compound, and
finishing the at least one profile element by applying profile element layers of the application compound and moving the finished profile element out of the working range.

3. The method according to claim 2, wherein, during application of a second or a further profile element layer on the profile element layer applied immediately beforehand, the print head is moved to rest thereon in such a way that a pretension is exerted on the previously printed profile element layer.

4. The method according to claim 1, wherein a first thermoplastic polyurethane is used for the toothed belt back at least at the profile element position.

5. The method according to claim 4, wherein the predetermined application temperature for the heating of at least the profile element position of the toothed belt back lies between the glass transition temperature of the first thermoplastic polyurethane and a temperature 20 K higher than the glass transition temperature of the first thermoplastic polyurethane.

6. The method according to claim 4, wherein a polyester and/or a polyether is used as the first thermoplastic polyurethane.

7. The method according to claim 4, wherein a second thermoplastic polyurethane is used as the application compound.

8. The method according to claim 7, wherein a polyester and/or a polyether is used as the second thermoplastic polyurethane of the application compound.

9. The method according to claim 1, wherein the first profile element layer by comparison with the second profile element layer is formed with at least 1.5 times the layer height.

10. The method according to claim 1, wherein the first profile element layer is printed with a material temperature which is between 5 K and 10 K above the melt temperature of the application compound, and that in the course of the layered application of the profile element layers the material temperature is reduced to a value above the melting temperature of the application compound which is less than 2.5 K above the melting temperature of the application compound.

11. The method according to claim 2, wherein the application compound is applied by a robot arm which moves the at least one print head, wherein the robot arm is movable along three spatial axes and in addition is pivotably movable about at least two of the three spatial axes, which are arranged parallel to the toothed belt back, and oriented at a right angle to one another.

12. The method according to claim 2, wherein before the application to the toothed belt back the application compound is stored in a drying chamber and is kept at a predetermined residual moisture content, the application compound being removed therefrom before delivery to the print head.

13. The method according to claim 1, wherein the application compound is applied with a residual moisture content of 0.05% by weight or less than 0.05% by weight.

14. The method according to claim 1, wherein an ambient temperature and/or an ambient humidity is monitored during the application and is kept at a respective constant, predetermined value.

15. The method according to claim 1, wherein before the application of the application compound to the toothed belt back, the toothed belt back is subjected to cleaning for removal of waxes.

* * * * *